United States Patent
Wong

(10) Patent No.: US 6,886,049 B2
(45) Date of Patent: Apr. 26, 2005

(54) MULTI-FUNCTION INTERFACE FOR CONNECTIVITY BETWEEN A COMMUNICATION DEVICE AND A HOST

(75) Inventor: Carl Wong, Burnaby (CA)

(73) Assignee: Sierra Wireless, Inc., Richmond (CA)

( * ) Notice: Subject to any disclaimer, the term of this patent is extended or adjusted under 35 U.S.C. 154(b) by 373 days.

(21) Appl. No.: 09/764,164

(22) Filed: Jan. 16, 2001

(65) Prior Publication Data

US 2002/0095530 A1 Jul. 18, 2002

(51) Int. Cl.$^7$ .............................................. G06F 13/14
(52) U.S. Cl. .............................. 710/8; 710/2; 710/300; 710/315; 711/115
(58) Field of Search .............................. 710/2, 8, 300, 710/315, 62; 709/219; 455/557

(56) References Cited

U.S. PATENT DOCUMENTS

| | | | | |
|---|---|---|---|---|
| 4,799,153 A | * | 1/1989 | Hann et al. ................ | 364/200 |
| 5,535,242 A | | 7/1996 | Brigida et al. ............. | 375/222 |
| 5,748,878 A | * | 5/1998 | Rees et al. ............. | 395/183.14 |
| 5,752,077 A | * | 5/1998 | Yiu et al. .................. | 395/827 |
| 5,784,633 A | * | 7/1998 | Petty .......................... | 710/60 |
| 5,790,958 A | * | 8/1998 | McCoy et al. .............. | 455/557 |
| 6,067,317 A | | 5/2000 | Fadavi-Ardekani et al. | 375/222 |
| 6,360,281 B1 | * | 3/2002 | Feagans ...................... | 710/1 |
| 6,389,486 B1 | * | 5/2002 | Petty .......................... | 710/8 |
| 6,463,469 B1 | * | 10/2002 | Yavitz ........................ | 709/219 |

FOREIGN PATENT DOCUMENTS

EP        0628908 A1    12/1994

* cited by examiner

*Primary Examiner*—A. Elamin
(74) *Attorney, Agent, or Firm*—Thelen Reid & Priest LLP

(57) ABSTRACT

A multi-function interface which allows connectivity between a communication device and a host is provided. The multi-function interface includes a plurality of logical devices which provide connectivity between the communication device and the host. The communication device transmits data and updates the host simultaneously using the plurality of logical devices which are associated with the peripheral device. The plurality of logical devices includes a communication port and status port. The communication port allows for the transmission of data between the host and the communication device. The status port updates the host with real-time status information as the communication device is transmitting data to the host.

41 Claims, 4 Drawing Sheets

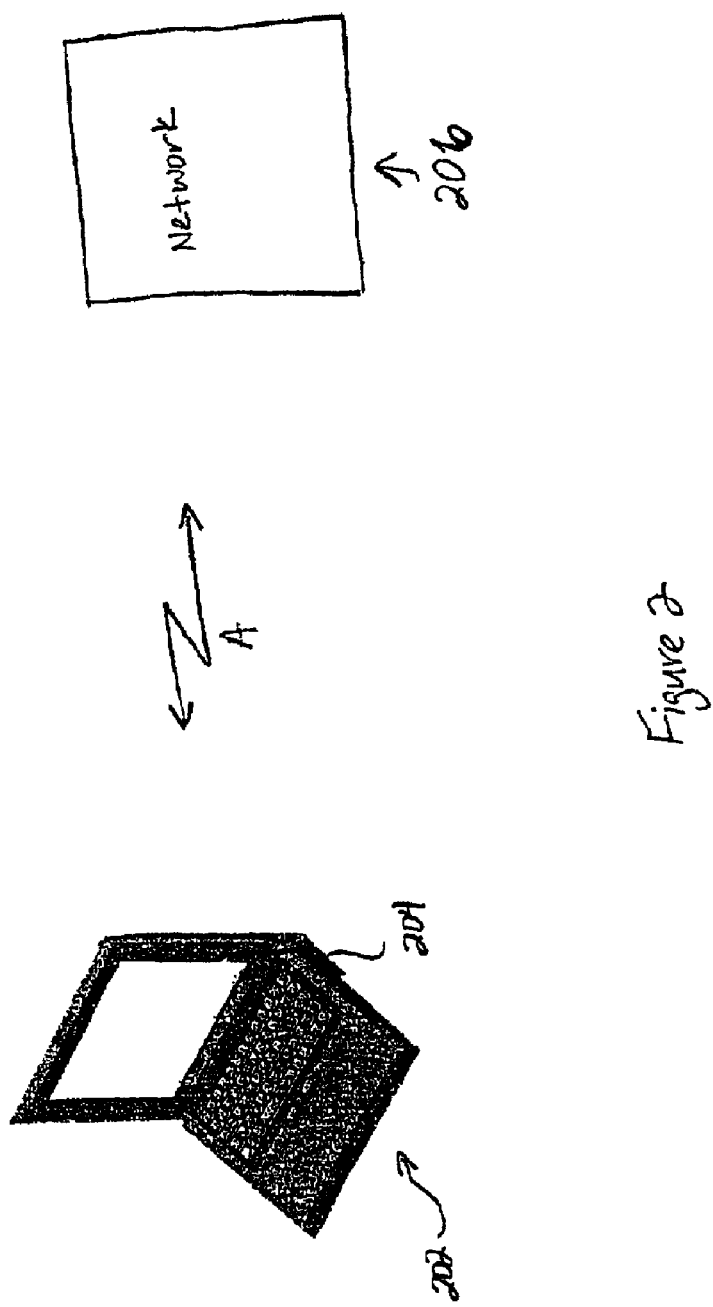

US 6,886,049 B2

MULTI-FUNCTION INTERFACE FOR CONNECTIVITY BETWEEN A COMMUNICATION DEVICE AND A HOST

BACKGROUND OF THE INVENTION

1. Field of the Invention

The present invention relates generally to wireless communications with a network, and more specifically the present invention relates to a multi-function interface which allows a wireless modem which provides real-time updating while on-line.

2. Description of Related Art

Today, users reliance on wireless communication continues to steadily increase. This reliance includes the use of wireless communication with laptop computers. These laptop computers have the ability to send and receive data, such as files and other attachments, using wireless PC cards such as wireless modems.

Typically, these wireless modems are in the form of PC cards and similar peripheral devices which are inserted into a laptop computer. When the wireless modem is inserted into the laptop computer, the wireless modem has one port which connects to the laptop computer. To further illustrate, reference is now made to FIG. 1A, which illustrates a prior art configuration where a wireless modem 104 is inserted into a laptop computer 106. The wireless modem 104 allows the laptop computer 106 to communicate with a communication device (not shown). When the wireless modem 104 is inserted into the laptop computer 106, the wireless modem 104 communicates with the with the laptop computer 106 via a communication port (COM PORT) 108. The communication port 108 is configured such that the wireless modem 104 transmits data to the laptop computer 106 while the wireless modem 104 is on-line.

However, as the wireless modem 104 is on-line and transmitting information to a communication device from the laptop computer, the wireless modem 104 loses contact with communication device. The wireless modem 104 loses contact for many reasons, including an increased temperature of the wireless modem 104 which may cause the wireless modem 104 to shut down. The wireless modem 104 may also lose contact due to a weak signal strength with the communication device or a complete loss of signal. However, if any of the aforementioned problems arise, the user is not informed as the wireless modem 104 is transmitting information since the wireless modem has only one way to contact the laptop computer 106, the communication port 108. The communication port 108 is occupied with the data transmission while the wireless modem 104 is transmitting. As a result, the wireless modem 104 has no other way to inform a user of the aforementioned problems. Therefore, if the modem loses contact with the communication device, the user is not informed of the loss of contact. Thus, the user will continue to transmit information with the wireless modem, once in fact the data sent is lost. In order for the user to determine whether or not contact is still maintained with the communication device, the user must go off-line in non-TCP/IP applications.

Now making reference to FIG. 1B, FIG. 1B shows another prior art wireless modem 110 which communicates with the laptop computer 106. In the configuration shown with respect to FIG. 1B, the wireless modem 110 is transmitting data using a transmission control protocol/internet protocol (TCP/IP) application. In this configuration, the wireless modem 110 has the ability to update a user of the status of the wireless modem 110 as the wireless modem 110 transmits data using TCP/IP. However, the wireless modem 110 is updating the laptop computer 106 using the same communication port 108. In addition, only when the wireless modem 110 is transmitting with TCP/IP can the wireless modem 110 update the user of the status of the wireless modem 110 during data transmission. As those skilled in the art will appreciate, when a user is transmitting non-TCP/IP applications, such as faxing or dialup applications, the user is not updated of the status of the wireless modem. As such, if the user is faxing data to another communication device and the signal is lost (i.e., user is outside of cell site coverage), a portion of the facsimile is lost.

Therefore, a need exists for a communication device which updates a user of status changes of the communication device during data transmission. Furthermore, this new communication device should have the ability to simultaneously transmit data and update the user of status changes.

BRIEF SUMMARY OF THE INVENTION

The present invention fills the aforementioned needs by providing a multifunction interface for a PC card. The multifunction interface provides communication port and status port capabilities to the PC card. The communication port allows the PC card to transmit data to and from a host. The status port allows the PC card to provide real-time status information of the PC card to the host as the PC card transmits data to and from the host.

In one embodiment of the present invention, a multi-function interface for interfacing a communication device with a host is disclosed. The multi-function interface includes a plurality of logical devices which are associated with the communication device. The plurality of logical devices provide connectivity between the communication device and the host. The plurality of logical devices are configured such that the plurality of logical devices may simultaneously communicate with the host while the communication device is on-line.

In a further embodiment of the present invention, a communication device which communicates with a host is disclosed. The communication device includes a plurality of logical devices associated with the communication device. The plurality of logical devices provide connectivity to the host with a communication port and a status port. The communication port transmits data between the communication device and the host. The status port provides real-time status information of the communication device to the host as the communication device is transmitting information using the communication port.

In yet another embodiment of the present invention, a multi-function interface which provides connectivity between a communication device and a computing device is disclosed. The multi-function interface includes a plurality of logical devices associated with the communication device. The plurality of logical devices establishes connectivity between the communication device and the computing device. The multi-function interface comprises a communication port and a status port. The communication port, which is one of the plurality of logical devices, transmits data between the communication device and the computing device. The status port, which is also one of the plurality of logical devices, provides real-time status information of the communication device as the communication port transmits data between the communication device and the computing device.

In another embodiment of the present invention, a wireless communication device which is in communication with a computing device is disclosed. A plurality of logical devices establishes connectivity between the wireless communication device and the computing device. The wireless communication devices includes a communication port and a status port. The communication port, which is a logical device of the plurality of logical devices, transmits data between the wireless communication device and the computing device. The status port, which is another logical device of the plurality of logical devices, provides real-time status information of the wireless communication device to the computing device as the communication port transmits data between the wireless communication device and the computing device.

As may be appreciated, the present invention now allows for a communication device to simultaneously transmit data and update a user with status information of the communication device as the communication device is transmitting the data. Thus, the user is updated with real-time status information of the communication device as the communication device is transmitting data.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements and wherein:

FIG. 2 illustrates a schematic of a host transmitting data, as denoted with bi-directional arrow "A", to a network in accordance with one embodiment of the present invention.

DETAILED DESCRIPTION OF THE INVENTION

The present invention discloses a multi-function interface which includes a plurality of logical devices that are associated with the communication device. As an overview, the multi-function interface of the present invention allows for a PC card to simultaneously transmit data to a host and provide status information of the PC card while the PC card is on-line. As will be more fully discussed with reference to the accompanying Figures, the PC card transmits data and provides status information using two logical devices associated with the PC card.

Now making reference to the Figures, and more particularly to FIG. 2, FIG. 2 illustrates a schematic of a host 202 transmitting data, as denoted with bi-directional arrow "A", to a network 206, in accordance with one embodiment of the present invention. The host 202 may be any computing device which contains a processor and memory. The network 206 may be any device or system which is a major communication carrier which facilitates communication with hosts connected to the major carrier. The host 202 uses the PC card 204 to wirelessly communicate with the network 206, as denoted with bi-directional arrow "A." The PC card 204 may be any type of card which allows for wireless communication between the host 202 and the network 206, such as a wireless modem. In one embodiment of the present invention, the PC card 204 is an AirCard™ 510 available from Sierra Wireless located in Richmond, British Columbia, Canada. As the PC card 204 transmits data between the network 206 and the host 202, the PC card 204 provides status information of the PC card 204 to the host 202, as shown with reference to FIG. 3.

Figure 1A:
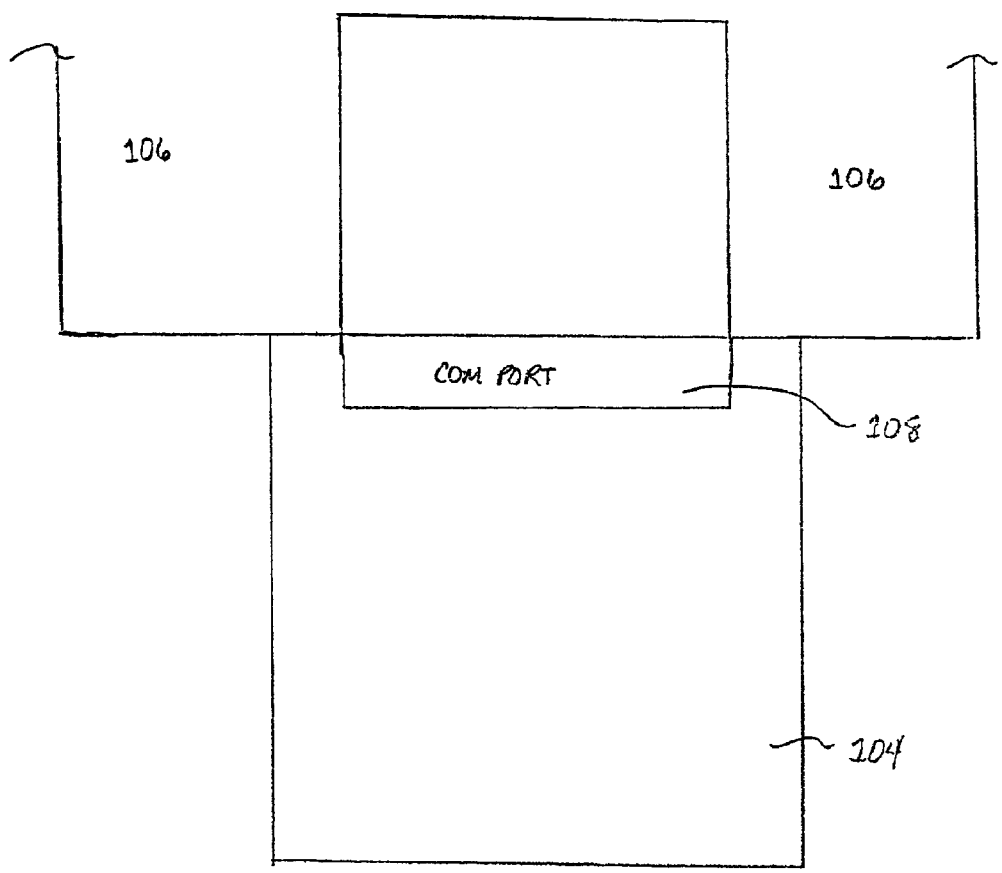
FIG. 1A illustrates a schematic of a prior art configuration of a wireless modem where the wireless modem is inserted into a laptop computer.
Figure 1B:
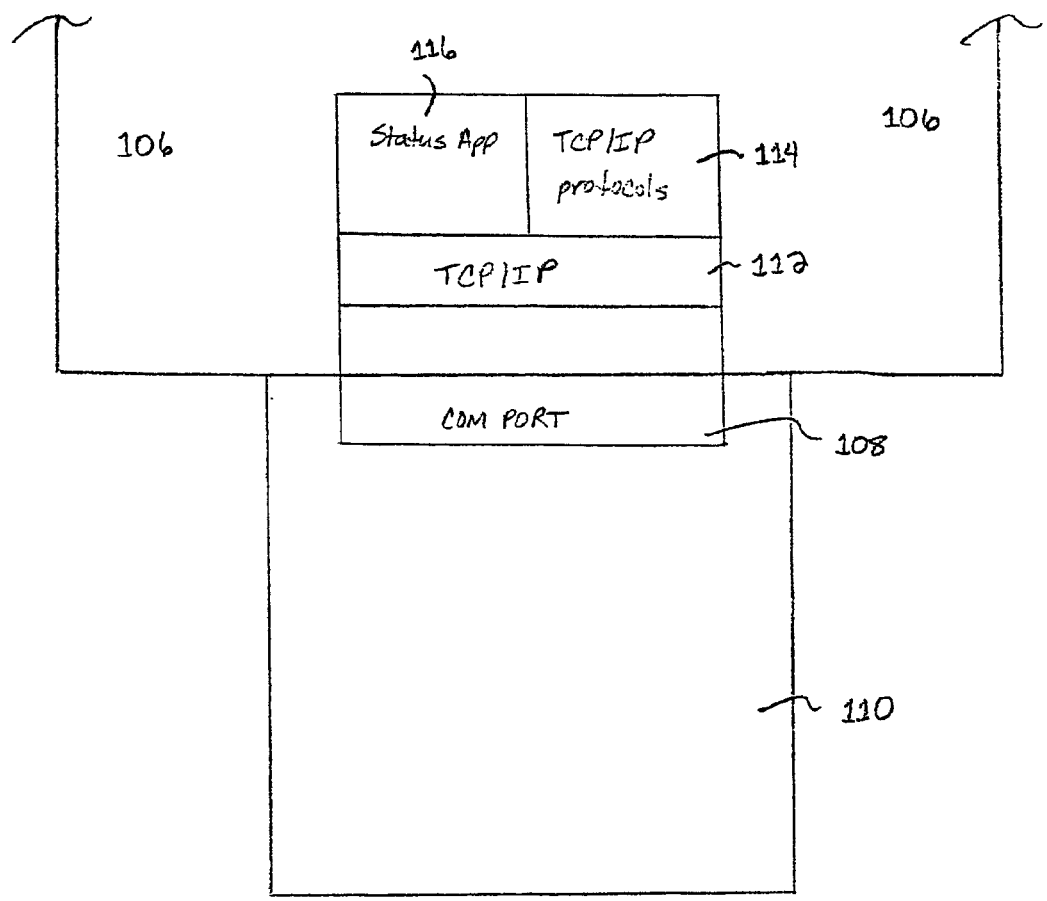
FIG. 1B shows another schematic of a prior art configuration where a wireless modem communicates with the laptop computer.
Figure 3:
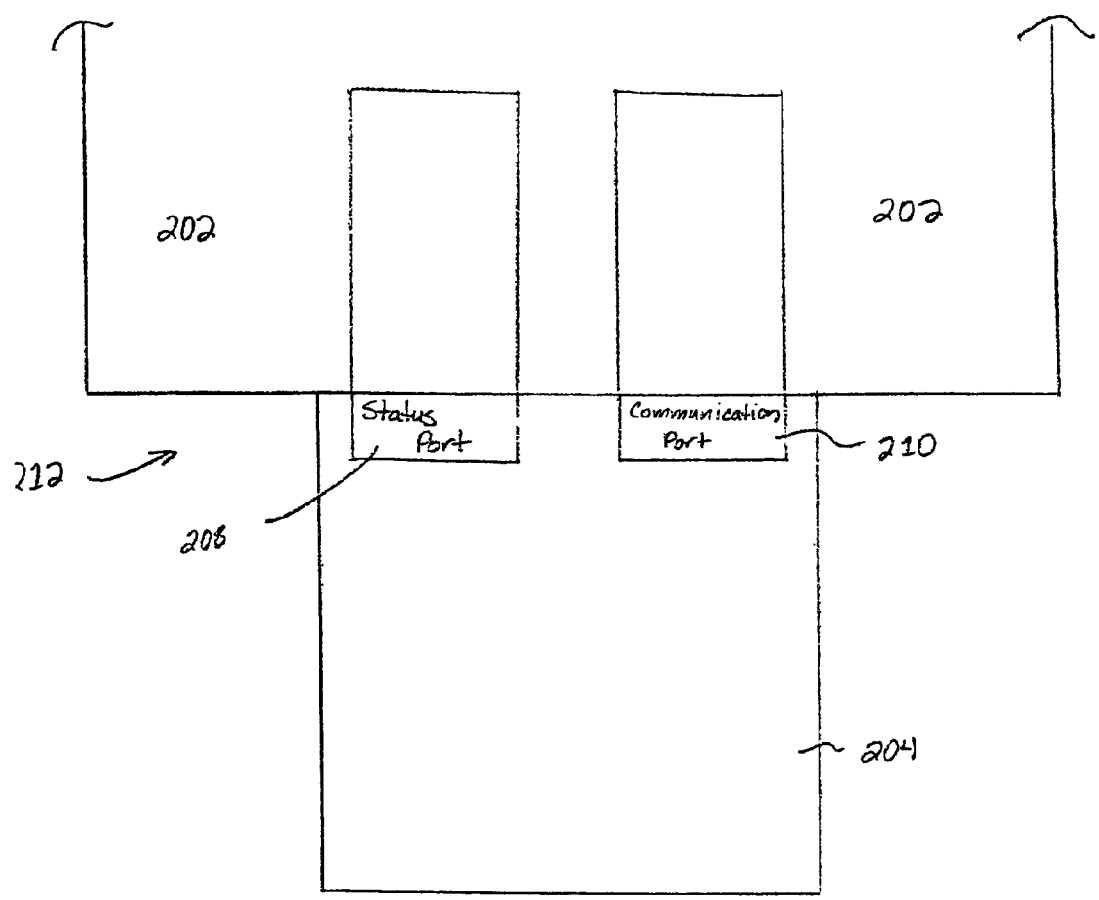
FIG. 3 shows a schematic of a multi-function interface which interfaces a PC card with the host shown with respect to FIG. 2 using a status port and a communication port, in accordance with one embodiment of the present invention.

FIG. 3 shows a schematic of a multi-function interface 212 which interfaces the PC card 204 with the host 202 shown with respect to FIG. 2, using a status port 208 and a communication port 210, in accordance with one embodiment of the present invention. When the PC card 204 communicates with the host 202, the PC card 204 implements two logical devices, the status port 208 and the communication port 210 of the multi-function interface 212. In one embodiment of the present invention, a field programmable gate array (FPGA) configures the status port 208 and the communication port 210 on the PC card 204. In this embodiment, the PC card 204 is a personal computer memory card international association (PCMCIA) card having multi-functional capabilities. The operating system of the host 202 is notified that the PC card 204 is a multi-functional device having two logical devices associated with the PC card 204. It should be noted that in another embodiment of the present invention, the PC card 204 and the associated logical devices are extendable to both internal and external modems for other bus technologies that support multi-function technology, such as universal serial bus (USB), CardBus or the like.

As discussed earlier, the status port 208 and the communication port 210 form the multi-function interface 212 which allow the PC card 204 to interface with the host 202. The status port 208 and the communication port 210 are two logical devices associated with the PC card 204. Thus, the status port 208 and the communication port 210 appear as two separate peripheral devices to the host 202. The status port 208 provides real-time status information to the host 202 while the PC card 204 and the host 202 are on-line using the communication port 210. The status information provided to the host 202 updates a user of various data (i.e., temperature of the PC card 204, signal strength of the PC card 204, etc.) as the PC card 204 transmits data with the host 202 to a second communication device (not shown).

The communication port 210 transmits data to and from the host 202 using various applications in one embodiment of the present invention. These applications include both internet protocol (IP) applications such as electronic mail and non-IP applications such as facsimile transmissions and dial-up applications. As stated earlier, the communication port 210 and the status port 208 are two logical devices associated with the PC card 204. Thus, as the communication port 210 transmits data to and from the host 202, the status port 208 simultaneously provides status information of the PC card 204 to the host 202 as the PC card 204 is transmitting data. Therefore, a user transmitting data with the PC card 204 is continually updated of the status of the PC card 204 as the PC card 204 is transmitting data to the network 206 (shown with reference to FIG. 2). It should be noted that the status port 208 and the communication port 210 are not two independent functions. Instead, the status port 208 and the communication port 210 are peripheral devices for the same function, the PC card 204, which, in one embodiment, is a wireless communication device.

As may be appreciated, the present invention now allows a user to monitor the status of a wireless modem as the wireless modem transmits data. There are many advantages to a user transmitting data with the wireless modem of the present invention. These advantages include the ability to monitor important status information of the wireless modem while data is transmitted. In one embodiment, this information includes frame error rate, the received signal strength of the wireless modem and roaming indication. In addition, as the wireless modem is on-line, the status port may be used to set and write various parameters, such as a system identification (SID) and a network identification (NID). The use of a status port and a communication port allows the user to monitor the signal strength of the wireless modem while transmitting. The user can then determine when data transmission should stop to minimize the possibility of losing information prior to loss of the signal. An example of this is a user transmitting data in a moving vehicle. If coverage (i.e., cell-site coverage) begins to diminish as the user moves further away from a cell-site, the user is informed of the weakening signal. Thus, a user is notified beforehand of the possibility of signal loss, thereby allowing the user the opportunity to plan for the signal loss. Also, the user is notified if the wireless modem does not have a signal. As such, the user will not transmit data when the wireless modem has lost the signal. Again, the possibility of losing information is avoided.

Another advantage of the present invention includes the ability to extend the present invention to other bus technologies, thereby increasing the functionality of the present invention. The present invention may use other bus technologies which support multifunction technologies. As such, the present invention may utilize other technologies as they become available.

Furthermore, in one embodiment, the wireless modem uses code division multiple access (CDMA) technology. The present invention is not limited to TCP/IP based applications. Thus, the present invention may implement all IP-based and all non-IP based applications, including electronic mail and facsimile transmissions.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A multi-function interface for interfacing a wireless modem with a host, the multi-function interface including a plurality of logical devices associated with the wireless modem such that the plurality of logical devices provide connectivity between the wireless modem and the host, wherein the plurality of logical devices includes a first logical device for providing both Internet Protocol (IP)-based and non-IP-based communication capabilities between the wireless modem and the host, and the plurality of logical devices includes a second logical device for providing real-time status information of the wireless modem to the host during operation.

2. A multi-function interface as recited in claim 1, wherein the first logical device is a communication port.

3. A multi-function interface as recited in claim 2, wherein the second logical device is a status port.

4. A multi-function interface as recited in claim 3, wherein the status port provides the real-time status information as the wireless modem is on-line.

5. A multi-function interface as recited in claim 1, wherein the wireless modem is a personal communication memory card international association (PCMCIA) card.

6. A multi-function interface as recited in claim 1, wherein the plurality of logical devices are configured using a field programmable gate array (FPGA) such that two communication port capabilities are provided.

7. A wireless modem which communicates with a host, the wireless modem including a plurality of logical devices associated with the wireless modem, where the plurality of logical devices provide connectivity to the host, and where at least one of the logical device accommodate both Internet Protocol (IP)-based and non-IP-based communications between the wireless modem and the host.

8. A wireless modem as recited in claim 7, wherein the plurality of logical devices includes a first logical device associated with the wireless modem.

9. A wireless modem as recited in claim 8, wherein the first logical device provides a status port between the wireless modem and the host.

10. A wireless modem as recited in claim 9, wherein the status port allows the wireless modem to provide real-time status information of the wireless modem to the host.

11. A wireless modem as recited in claim 10, wherein the real-time status information of the wireless modem includes the signal strength of radio frequency signals being received by the wireless modem.

12. A wireless modem as recited in claim 10, wherein the real-time status information of the wireless modem includes the temperature of the wireless modem as the wireless modem communicates with other communication devices.

13. A wireless modem as recited in claim 8, wherein the plurality of logical devices includes a second logical device associated with the wireless modem.

14. A wireless modem as recited in claim 13, wherein the second logical device provides a communication port between the wireless modem and the host.

15. A wireless modem as recited in claim 14, wherein the communication port allows the wireless modem to transmit data from the host to another communication device.

16. A wireless modem as recited in claim 13, wherein the first logical device and the second logical device communicate simultaneously with the host.

17. A wireless modem as recited in claim 13, wherein the second logical device transmits IP based and non-IP based applications.

18. A multi-function interface which provides connectivity between a wireless communication device and a computing device, where connectivity is established using a plurality of logical devices associated with the wireless communication device, the multi-function interface comprising:
   a communication port, the communication port being one of the plurality of logical devices, the communication port transmitting both Internet Protocol (IP)-based and non-IP-based data between the wireless communication device and the computing device; and
   a status port, the status port being one of the plurality of logical devices, the status port providing real-time status information of the wireless communication devise when the communication port transmits data.

19. A multi-function interface as recited in claim 18, wherein the communication port is configured using a field programmable gate array (FPGA).

20. A multi-function interface as recited in claim 18, wherein the status port is configured using a field programmable gate array (FPGA).

21. A multi-function interface as recited in claim 18, wherein the communication port and the status port communicate with the host simultaneously.

22. A multi-function interface as recited in claim 18, wherein the wireless communication device is a wireless modem.

23. A multi-function interface as interface as recited in claim 22, wherein the real-time status information includes a signal strength of radio frequency signals being received by the wireless modem as the data is transmitted between the wireless modem and the host.

24. A multi-function interface as recited in claim 22, wherein the real-time status information includes informing the host if the wireless modem is maintaining a signal with a network during data transmission.

25. A wireless communication device in communication with a computing device, where connectivity between the wireless communication device and the computing device is established with a plurality of logical devices, the wireless communication device comprising:

a communication port, the communication port being a logical device of the plurality of logical devices, where the communication port is capable of transmitting both Internet Protocol (IP)-based and non-IP-based data between the wireless communication device and the computing device; and a status port, the status port being another logical device of the plurality of logical devices, where the status port provides real-time status information to the computing device as the communication port transmits data between the wireless communication device and the computing device.

26. A wireless communication device as recited in claim 25, wherein the wireless communication device is a personal computer memory card international association (PCMCIA) card.

27. A wireless communication device as recited in claim 25, wherein the wireless communication device is a wireless modem.

28. A wireless communication device as recited in claim 25, wherein the real-time status information includes a temperature of the wireless modem.

29. A wireless communication device as recited in claim 25, wherein the real-time status information includes a signal strength of radio frequency signals being received by the wireless modem as the wireless modem transmits the data.

30. A wireless communication device as recited in claim 25, wherein the communication port and the status port simultaneously communicate with the host.

31. A wireless communication device as recited in claim 25, wherein a field programmable gate array (FPGA) is used to configure the communication port.

32. A wireless communication device as recited in claim 25, wherein a field programmable gate array (FPGA) is used to configure the status port.

33. A multi-function interface for providing connectivity between a wireless network interface card (NIC) and a host computer, comprising:

a communication port configured to transmit either Internet Protocol (IP)-based or non-IP-based data between the wireless NIC and the host computer; and a status port configured to provide status information to the host computer while the wireless NIC is transmitting data to a remote device.

34. The multi-function interface of claim 33 wherein the status port is further configured to provide status information to the host computer while the host computer communicates with the wireless NIC.

35. The multi-function interface of claim 33 wherein the status port is further configured to provide status information to the host computer while the wireless NIC is receiving data from the remote device.

36. The multi-function interface of claim 33 wherein the status port is further configured to provide status information to the host during a time when there is no wireless network connection between the wireless NIC and the remote device.

37. The multi-function interface of claim 36 wherein the status information comprises a connection status of the wireless network connection.

38. The multi-function interface of claim 36 wherein the status information comprises an operational condition of the wireless NIC.

39. The multi-function interface of claim 33 wherein the status information comprises a connection status of the wireless network connection between the remote device and the wireless NIC.

40. The multi-function interface of claim 39 wherein said status of the wireless network connection includes an indication of signal strength.

41. The multi-function interface of claim 33 wherein the status information comprises an operational condition of the wireless NIC.

* * * * *

UNITED STATES PATENT AND TRADEMARK OFFICE
CERTIFICATE OF CORRECTION

PATENT NO. : 6,886,049 B2
APPLICATION NO. : 09/764164
DATED : April 26, 2005
INVENTOR(S) : Wong It is certified that error appears in the above-identified patent and that said Letters Patent is hereby corrected as shown below:

In column 1 line 32, replace "with the with the" with --with the--.

In column 3 line 4, replace "devices" with --device--.

In column 5 line 66, replace "personal communication" with --personal computer--.

In column 6 line 9, replace "device" with --devices--.

In column 6 line 56, replace "providing" with --configured to provide--.

In column 6 line 58, replace "devise" with --device--.

In column 7 line 12, replace "a network" with --a wireless network--.

In column 8 line 37, replace "status of the" with --status of a--.

Signed and Sealed this

Fifth Day of October, 2010

David J. Kappos
*Director of the United States Patent and Trademark Office*